United States Patent
Nagaraj (10) Patent No.: US 9,253,061 B2
(45) Date of Patent: Feb. 2, 2016

(54) TUNNEL HEALTH CHECK MECHANISM IN OVERLAY NETWORK

(75) Inventor: Uday Shankar Nagaraj, Sunnyvale, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 328 days.

(21) Appl. No.: 13/612,526

(22) Filed: Sep. 12, 2012

(65) Prior Publication Data

US 2014/0075243 A1 Mar. 13, 2014

(51) Int. Cl.
- *G06F 11/28* (2006.01)
- *H04L 12/26* (2006.01)
- *H04L 29/06* (2006.01)
- *H04L 12/46* (2006.01)

(52) U.S. Cl.
CPC ............ *H04L 43/0811* (2013.01); *H04L 43/10* (2013.01); *H04L 12/4641* (2013.01); *H04L 63/0209* (2013.01); *H04L 63/0227* (2013.01)

(58) Field of Classification Search
CPC ............ H04L 12/4641; H04L 63/0209; H04L 63/0227; G06F 21/577; G06F 11/28; G06F 2221/033
USPC .............................. 370/395; 714/32, E11.178
See application file for complete search history.

(56) References Cited

U.S. PATENT DOCUMENTS

| | | | |
|---|---|---|---|
| 5,452,292 A * | 9/1995 | Okanoue et al. | 370/403 |
| 8,019,868 B2 | 9/2011 | Rao et al. | |
| 2005/0099959 A1 * | 5/2005 | Standridge | H04L 41/145 370/252 |
| 2007/0112975 A1 * | 5/2007 | Cassar | H04L 29/12933 709/239 |
| 2009/0109841 A1 * | 4/2009 | Nozaki | H04L 45/00 370/218 |
| 2009/0245122 A1 | 10/2009 | Maiocco et al. | |
| 2010/0067381 A1 | 3/2010 | Hirano et al. | |
| 2010/0085915 A1 * | 4/2010 | Hirano | H04L 45/64 370/328 |
| 2010/0131636 A1 * | 5/2010 | Suri | H04L 45/00 709/224 |
| 2011/0110377 A1 * | 5/2011 | Alkhatib | H04L 61/2507 370/395.53 |
| 2012/0216273 A1 * | 8/2012 | Rolette | G06F 21/577 726/13 |
| 2013/0318238 A1 * | 11/2013 | Hall | H04L 43/028 709/224 |

OTHER PUBLICATIONS

Templin, F. et al.; The Internet Routing Overlay Network (IRON), IP.com, Mar. 13, 2011.
Anonymous; Health Check Process for a Storage Area Network (SAN) Volume Controller, IP.com, Jan. 10, 2012.
IBM TDB; Business Method of Using Host Based Health Checking and Vulnerability Mitigation, IP.com, Jun. 20, 2003.

\* cited by examiner

*Primary Examiner* — Jae Y Lee
*Assistant Examiner* — Jean F Voltaire
(74) *Attorney, Agent, or Firm* — Shimokaji IP (57) ABSTRACT

A health check mechanism for an overlay network may employ tunneling technology. A health check packet may be sent between endpoints. The health check packet may be recognized in the network and may initiate a health check process on receipt. In some embodiments, the health check packet may include a signature recognized by the network. A destination endpoint, upon receipt of the health check packet, may provide health check statistics to a source endpoint.

20 Claims, 6 Drawing Sheets

TUNNEL HEALTH CHECK MECHANISM IN OVERLAY NETWORK

BACKGROUND

The present invention relates to network maintenance, and more specifically, to a tunnel health check mechanism in an overlay network.

In some networks non-connection oriented tunnels may be employed to transport data between endpoints. This may be primarily due to the large number of endpoint pairs and the high cost of maintaining connection information which could be cost prohibitive. However, because only endpoints may be able to read data packets, it may be unknown whether traffic from a source is reaching the destination. Thus, it can be seen that employing a health check mechanism may be beneficial toward ensuring the operating efficiency of an overlay network.

SUMMARY

According to one embodiment of the present invention, a computer program product for providing a tunnel health check mechanism, comprises a computer readable storage medium having computer readable program code embodied therewith. The computer readable program code is configured to: identify a first endpoint in a distributed overlay virtual Ethernet network; identify a second endpoint in the distributed overlay virtual Ethernet network; provide a tunneled health check packet configured to provide acknowledgment of receipt at the second endpoint and to indicate to the second endpoint to provide health check information to the first endpoint; and send the tunneled health check packet from the first endpoint to the second endpoint.

According to another embodiment of the present invention, a distributed overlay virtual Ethernet network comprises a first virtual machine, a second virtual machine in communication with the first virtual machine, and a controller. The controller may be configured to control tunneled data packets travelling between the first virtual machine and the second virtual machine along a path in the distributed overlay virtual Ethernet network. The controller may also be configured to provide a tunneled health check packet configured to initiate a health check process corresponding to tunneled data packet traffic along the path between the first virtual machine and the second virtual machine in the distributed overlay virtual Ethernet network.

According to yet another embodiment of the present invention, a network server comprises one or more switching elements and a computer readable storage medium having computer readable program code embodied therewith. The computer readable program code may be configured to: host one or more virtual machines in a distributed overlay virtual Ethernet network; identify a network path hosting tunneled data packet traffic between a first endpoint in the distributed overlay virtual Ethernet network and a second endpoint in the distributed overlay virtual Ethernet network; and provide a tunneled health check packet configured to initiate a health check process corresponding to the tunneled data packet traffic on the network path.

DETAILED DESCRIPTION

As will be appreciated by one skilled in the art, aspects of the present invention may be embodied as a system, method or process, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable storage media having computer readable program code embodied thereon.

Any combination of one or more computer readable storage media may be utilized. A computer readable storage medium is an electronic, magnetic, optical, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium is any tangible medium that can store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics may include:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities may be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email).

The consumer need not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer need not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications.

The consumer need not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 1:
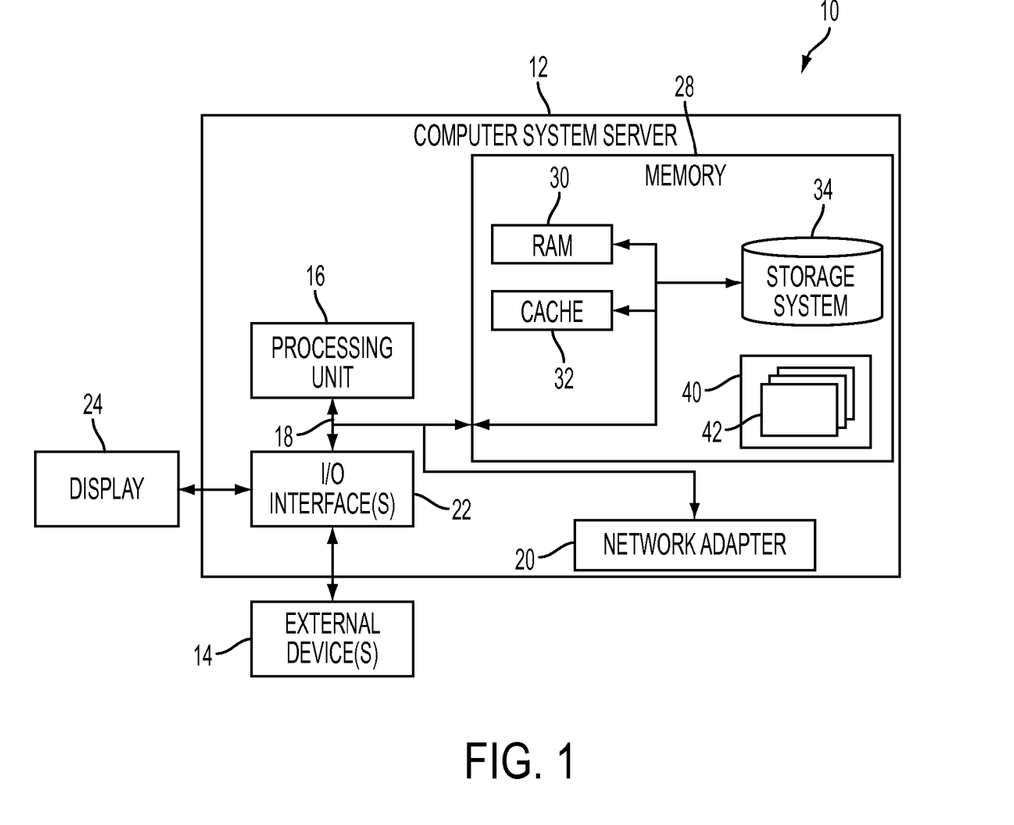
FIG. 1 depicts a cloud computing node according to an embodiment of the present invention.

Referring now to FIG. 1, a schematic of an example of a cloud computing node 10 is shown. The cloud computing node 10 illustrated is only one example of a suitable cloud computing node and is not intended to suggest any limitation as to the scope of use or functionality of embodiments of the invention described herein. Regardless, the cloud computing node 10 is capable of being implemented and/or performing any of the functionality set forth hereinabove.

In the cloud computing node 10 there is a computer system/server 12, which is operational with numerous other general purpose or special purpose computing system environments or configurations. Examples of well-known computing systems, environments, and/or configurations that may be suitable for use with the computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system/server 12 may be described in the general context of computer system executable instructions, such as program modules, being executed by a computer system. Generally, program modules may include routines, programs, objects, components, logic, data structures, and so on that perform particular tasks or implement particular abstract data types. The computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, a computer system/server 12 in the cloud computing node 10 is shown in the form of a general-purpose computing device. The components of the computer system/server 12 may include, but are not limited to, one or more processors or processing units 16, a system memory 28, and a bus 18 that couples various system components including the system memory 28 to the processor 16.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 12 may typically include a variety of computer system readable media. Such media could be chosen from any available media that is accessible by computer system/server 12, including volatile and non-volatile media, removable and non-removable media.

The system memory 28 could include one or more computer system readable media in the form of volatile memory, such as a random access memory (RAM) 30 and/or a cache memory 32. The computer system/server 12 may further include other removable/non-removable, volatile/non-volatile computer system storage media. By way of example only, a storage system 34 can be provided for reading from and writing to a non-removable, non-volatile magnetic media device typically called a "hard drive" (not shown). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to the bus 18 by one or more data media interfaces. As will be further depicted and described below, the system memory 28 may include at least one program product having a set (e.g., at least one) of program modules that are configured to carry out the functions of embodiments of the invention.

A program/utility 40, having a set (at least one) of program modules 42, may be stored in the system memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

The computer system/server 12 may also communicate with one or more external devices 14 such as a keyboard, a pointing device, a display 24, etc.; one or more devices that enable a user to interact with the computer system/server 12; and/or any devices (e.g., network card, modem, etc.) that enable the computer system/server 12 to communicate with one or more other computing devices. Such communication can occur via Input/Output (110) interfaces 22. Alternatively, the computer system/server 12 can communicate with one or more networks such as a local area network (LAN), a general wide area network (WAN), and/or a public network (e.g., the Internet) via a network adapter 20. As depicted, the network adapter 20 may communicate with the other components of computer system/server 12 via the bus 18. It should be understood that although not shown, other hardware and/or software components could be used in conjunction with the computer system/server 12. Examples, include, but are not limited to: microcode, device drivers, redundant processing units, external disk drive arrays, RAID systems, tape drives, and data archival storage systems, etc.

Figure 2:
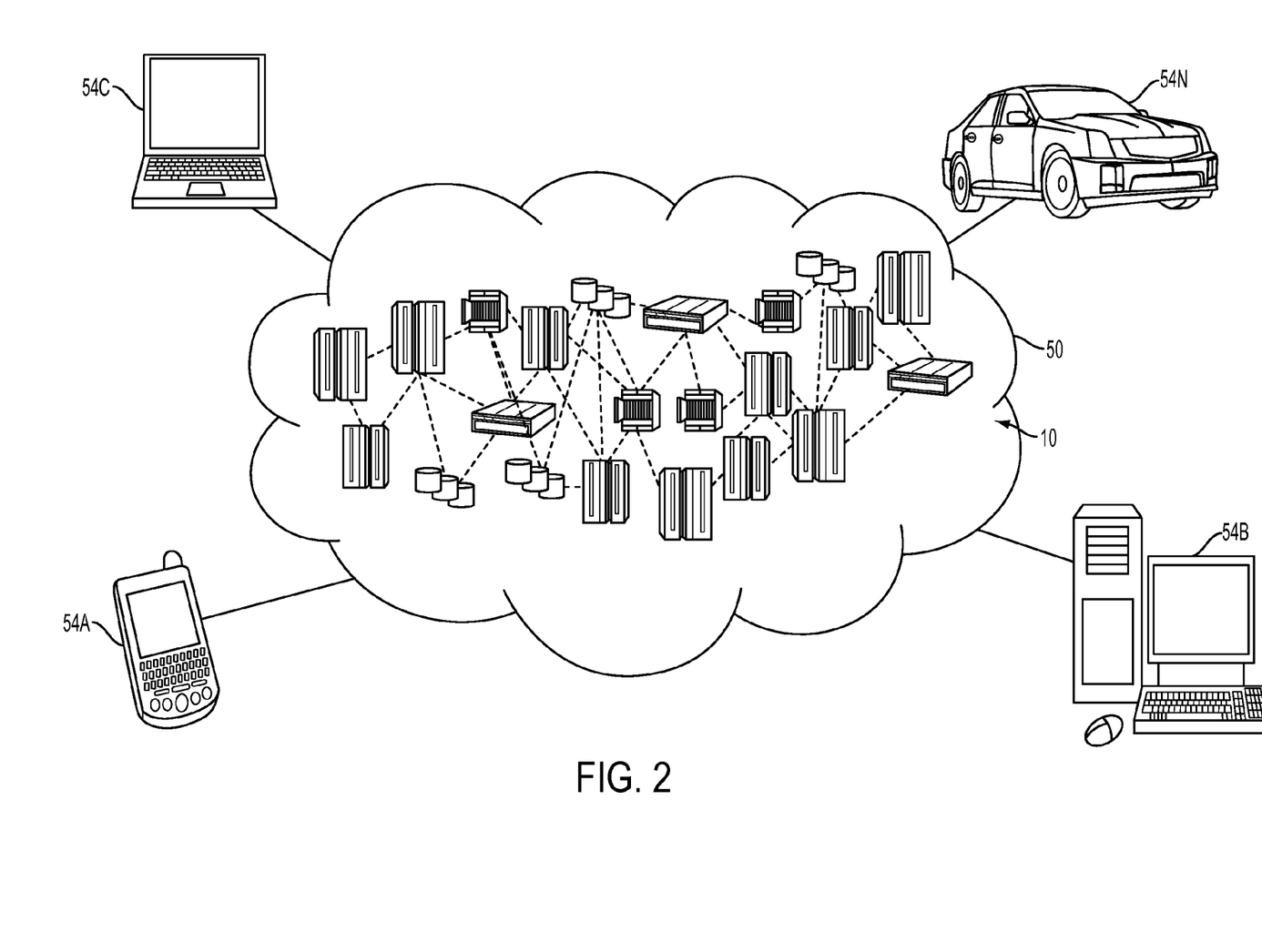
FIG. 2 depicts a cloud computing environment according to another embodiment of the present invention.

Referring now to FIG. 2, an illustrative cloud computing environment 50 is depicted. As shown, the cloud computing environment 50 comprises one or more cloud computing nodes 10 with which local computing devices used by cloud consumers, such as, for example, a personal digital assistant (PDA) or a cellular telephone 54A, desktop computer 54B, laptop computer 54C, and/or a automobile computer system 54N, may communicate. The nodes 10 may communicate with one another. They may be grouped physically or virtually, in one or more networks, such as Private, Community, Public, or Hybrid clouds as described hereinabove, or a combination thereof. This allows cloud the computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that the computing nodes 10 and the cloud computing environment 50 can communicate with any type of computerized device over any type of network and/or network addressable connection (e.g., using a web browser).

Figure 3:
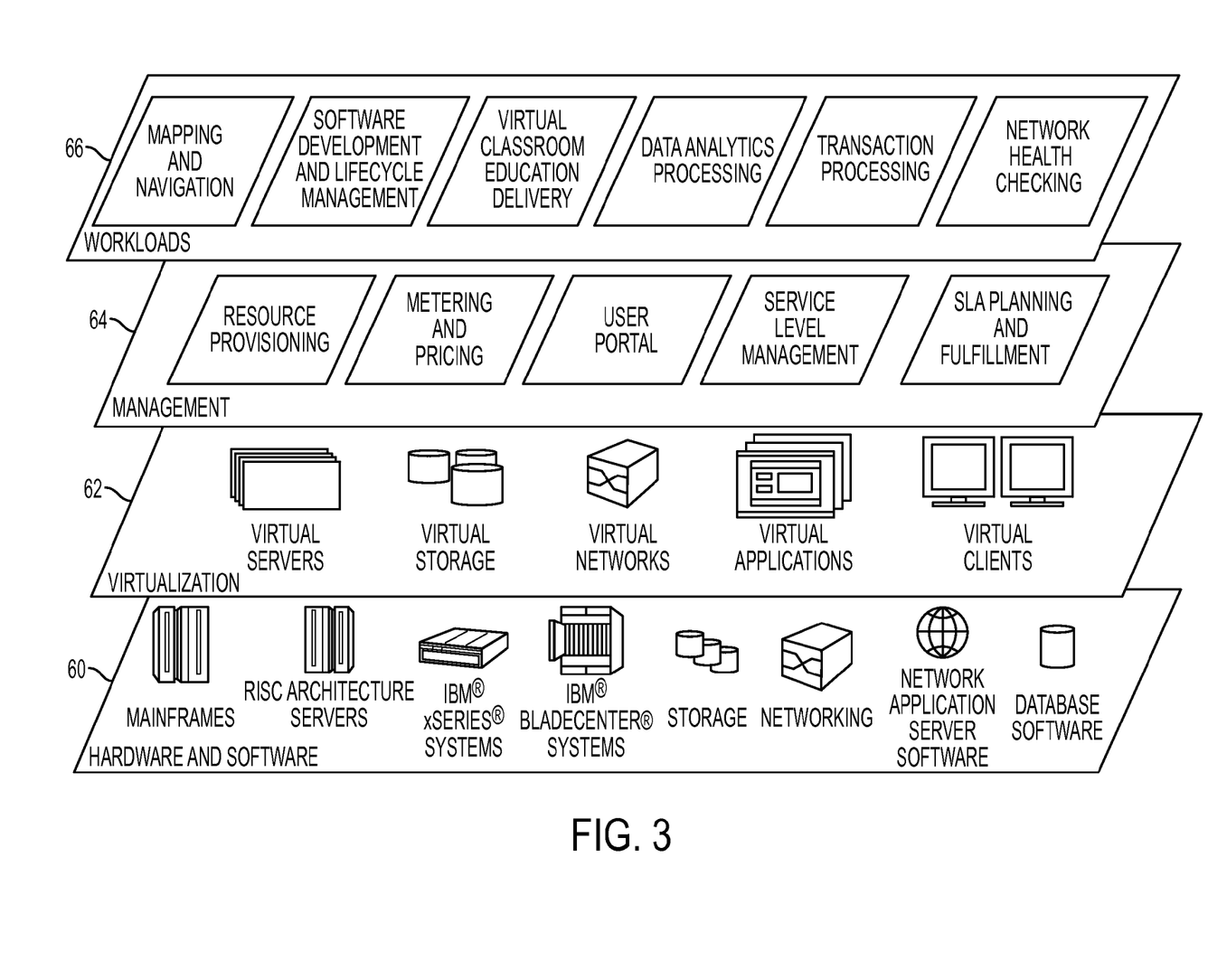
FIG. 3 depicts abstraction model layers according to yet another embodiment of the present invention.

Referring now to FIG. 3, a set of functional abstraction layers provided by the cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

A hardware and software layer 60 may include hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

A virtualization layer 62 provides an abstraction layer from which the following examples of virtual entities may be provided: virtual servers; virtual storage; virtual networks, including virtual private networks; virtual applications and operating systems; and virtual clients.

In one example, a management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

A workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and health checking in overlay networks.

Figure 4:
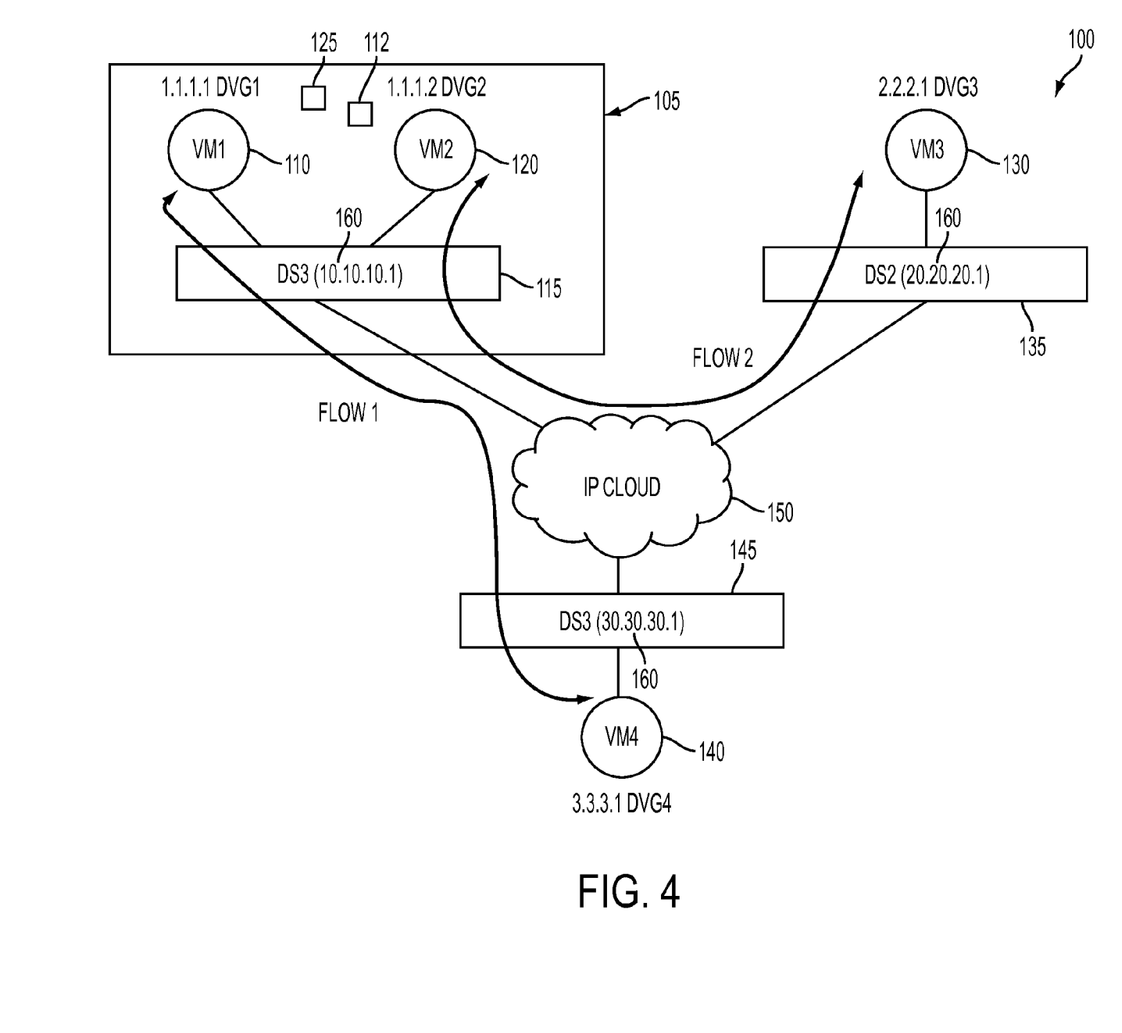
FIG. 4 is a block diagram of an overlay network according to still another embodiment of the present invention.

Referring now to FIG. 4, an overlay network 100 is shown according to an exemplary embodiment of the present invention. The overlay network 100 may be a distributed overlay virtual Ethernet network. In embodiments of the invention, the overlay network 100 may include one or more network servers 105. The server 105 may include a computer readable storage medium 125. The server 105 may include a controller 112 configured to control network traffic and health checking. The overlay network 100 may include a plurality of endpoints (110, 120, 130, 140) connected to one another via network paths. In an exemplary embodiment of the present invention, the overlay network 100 may be part of a cloud computing network 150. In some embodiments of the invention, the endpoints (110, 120, 130, 140) may be virtual machines. As shown for sake of illustration, endpoints 110 and 120 may be resident on the server 105 while other endpoints 130 and 140 (shown as unassociated with any particular server) may be migratory, moving among servers.

Each endpoint (110, 120, 130, 140) may be connected to a switch (115, 135, 145). The switches (115, 135, 145) may be distributed overlay virtual Ethernet network switches. For example, endpoints 110 and 120 correspond to switch 115 resident on server 105. Endpoint 130 may correspond to switch 135. Endpoint 140 may correspond to switch 145. Each switch (115, 135, 145) may have its own IP address 160. In an exemplary embodiment of the invention, packet data may be controlled to pass between any two endpoints (110, 120, 130, 140). As shown in FIG. 4, data traffic may be sent between endpoint 110 and endpoint 140 (shown as "Flow 1"). Another connection of packet traffic may be between endpoint 120 and endpoint 130 (shown as "Flow 2"). In an exemplary embodiment, Flow 1 and Flow 2 may comprise tunneled data packets being passed between endpoints (110 and 140 or 120 and 130).

In an exemplary embodiment of the invention, a health check mechanism may employ a tunneled health check packet (not shown) sent from one endpoint to another endpoint. In one embodiment of the invention, health check packets may be exchanged between user world agents using a reserved DomainID. It may be appreciated that faster identification of the health check packets may be achieved using a reserved DomainID when received at a destination switch (115, 135, 145).

In another embodiment if the invention, heath check packets may be exchanged between endpoints (110, 120, 130, 140) with the DomainID set to which network attributes are used within actual flows. For example, in Flow 1, a health check packet may be sent from endpoint 110 to endpoint 140. The health check packet may be sent along the same network path as data packets exchanged between endpoint 110 and endpoint 140. (Wherever, in the claims, one packet is recited as traveling along "a network path" and another packet is recited in the same claim—or in a claim depending from that claim—as traveling along "the network path", they are understood to be traveling along the same path.) The health check packet may be configured so that upon receipt switch 145 may recognize the packet as a health check request. Switch 145 may send acknowledgement of receipt to endpoint 110. The health check packet may be configured so that switch 145 may strip away data related to identifying the packet as a health check request and analyze the data requests contained within the packet payload. The endpoint 140 may provide the requested health check data in a response back to endpoint 110. While the above description related to Flow 1, it will be understood that Flow 2 may employ a similar health check request mechanism.

Figure 5:
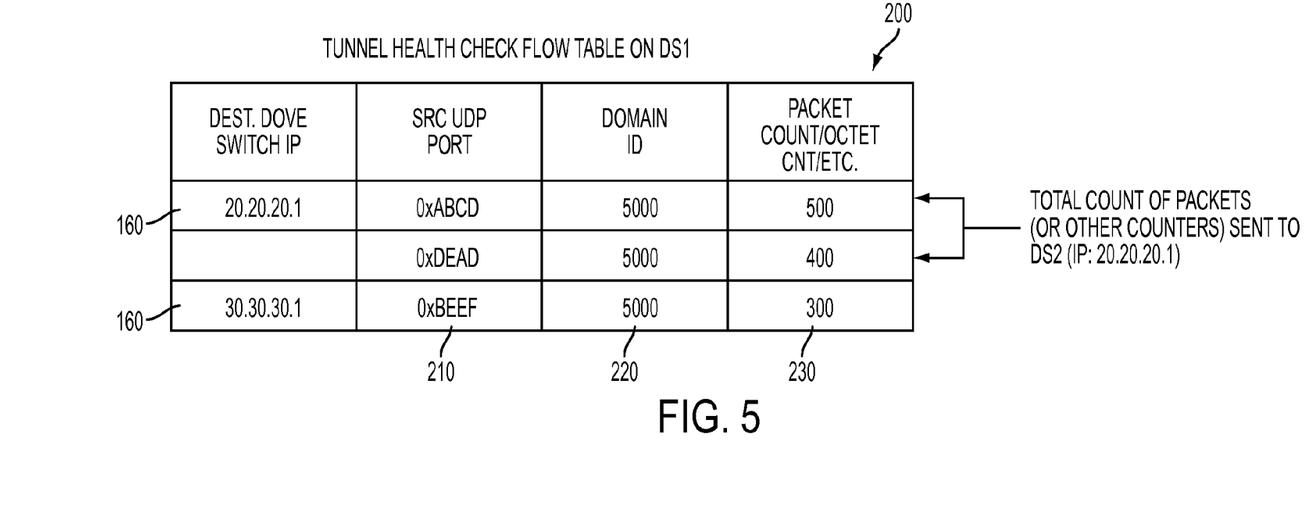
FIG. 5 is a health check table including health check information of a flow in the overlay network of FIG. 4.

Referring now to FIG. 5, a health check flow table 200 is shown. The table 200 may be populated with health check data corresponding to switch 115. The table 200 may include the IP address (160) indentifying the destination end of a switch (115, 135, 145). For sake of illustration, only data related to flows where switch 115 is a source end of a flow populates the table 200. The table 200 may include a source UDP port address 210, a domain ID 220, and a count (230) (e.g., a packet count, octet count, or other count) at the corresponding destination switch (as shown, either switch 135 or switch 145). The data path monitored by count 230 may be dependent on the switch (135, 145) and the source UDP port (210) tunneled data traffic travels through.

Figure 6:
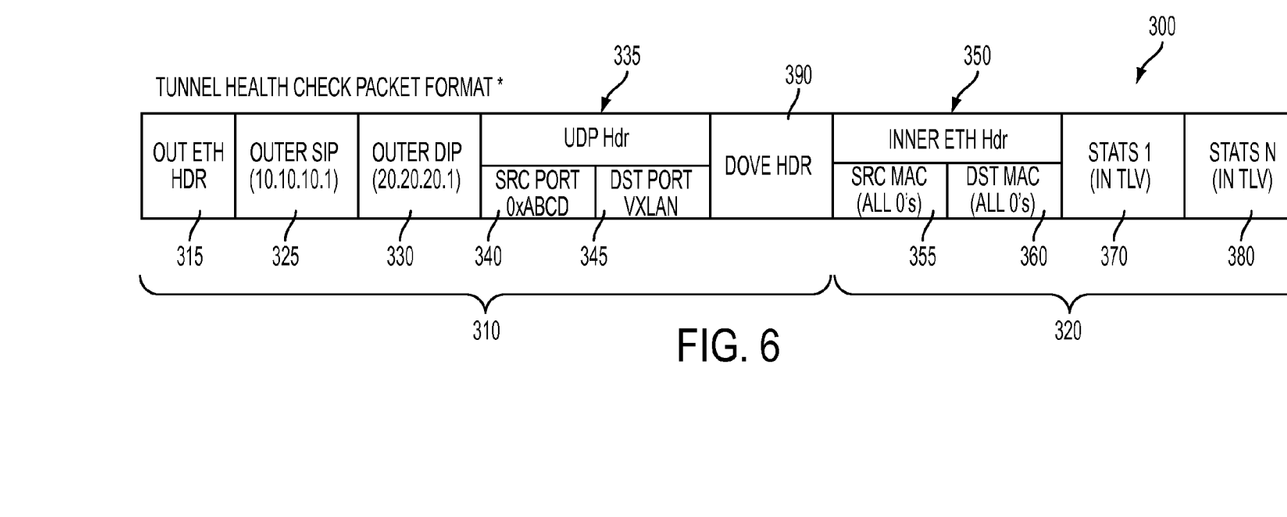
FIG. 6 is a block diagram of a health check packet used in the overlay network of FIG. 4 according to still yet another embodiment of the present invention.

Referring now to FIG. 6, a health check packet 300 is shown according to an exemplary embodiment of the present invention. The health check packet 300 may include an outer portion 310 and an inner portion 320. It will be understood that other data segments may be added to the health check packet 300 but for sake of illustration, the data segments shown are provided to describe an exemplary embodiment. In embodiments of the invention, the health check packet 300 may be tunneled so that recognition of the data contained may only be deciphered at endpoints (110, 120, 130, 140). The outer portion 310 may include an outer Ethernet header 315, an outer source IP address header (325), an outer destination IP address (330), a UDP header (335), and a distributed overlay virtual Ethernet network header 390. In some embodiments, data packets may share the same data headers as the outer portion 310.

In an exemplary embodiment of the present invention, the health check packet 300 may include a health check signature 350. The health check signature 350 may signal to a receiving switch (115, 135, 145) that the health check packet 300 includes information related to a health check request. The health check signature 350 may be in the inner portion 320. The health check signature 350 may be positioned where an inner Ethernet header of a data packet would be placed. The health check signature 350 may include flags indicating the packet should not be treated as a typical data packet for processing. The health check packet 300 may be configured so that it should not be treated according to the source MAC address and destination MAC address information. For example, the first 12 bytes of the inner portion 320 may include information showing that the source MAC address and destination MAC address appear as "0". When the receiving switch (135, 145) receives a packet and parses the inner portion 320 and sees the source MAC address and destination MAC address of 0, it would identify the packet as a health check packet. In some embodiments, the health check signature 350 may be followed by packet data (370, 380). The packet data (370, 380) may include, for example timestamps, statistics and counters in a type-length-value (TLV) format that could be used to indicate tunnel health of the flow. It may be appreciated that in some overlay networks (100), even if routers (not shown) are employed for performing ECMP/LAG hashing based on a VXLAN Id field, the path of the health check packets may still follow the same path as data packets.

Figure 7:
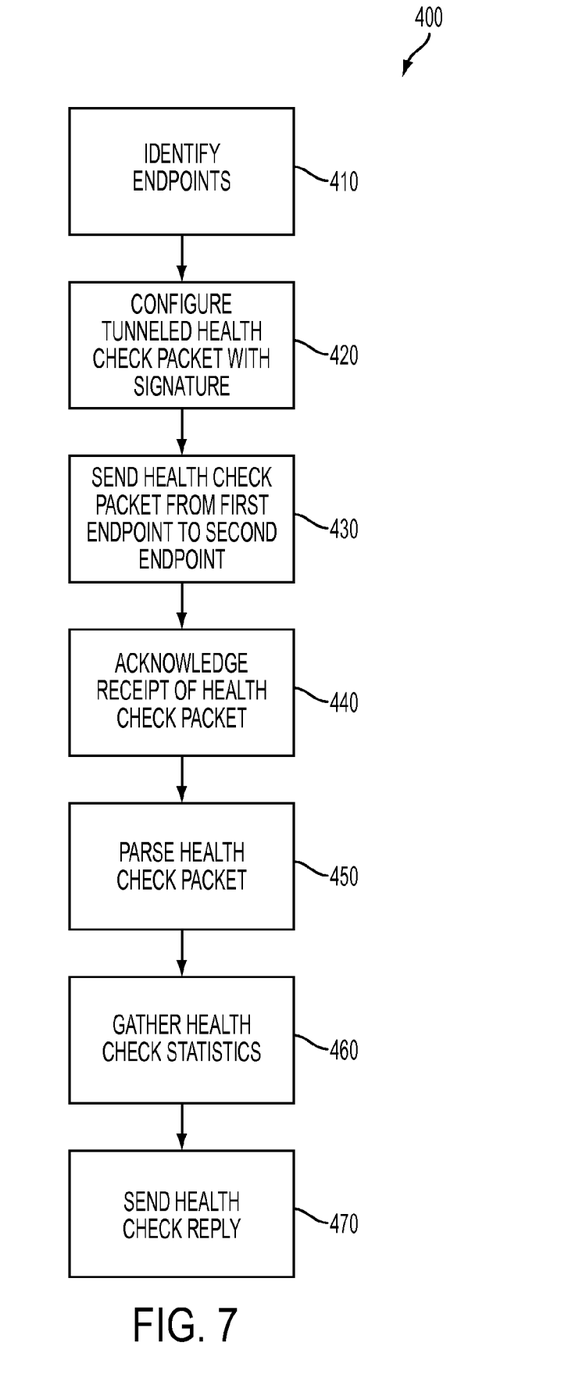
FIG. 7 is a flowchart of a process of health checking between endpoints in the overlay network of FIG. 4 according to still yet another embodiment of the present invention.

Referring now to FIG. 7, a process 400 of providing a tunnel health check mechanism is shown with concurrent reference to elements of FIGS. 4 and 6. The controller 112 may indentify in step 410 endpoints (110, 120, 130, 140) along a network path for a health check. The controller 112 may configure in step 420 a packet for a health check. The health check packet 300 may be tunneled and may include a health check signature 350. The controller 112 may send in step 430 the health check packet 300 from a source endpoint to a destination endpoint, for example, from endpoint 110 to endpoint 140 in Flow 1. The health check packet 300 may be sent along the same network path as data packets travelling between endpoint 110 and endpoint 140. The destination endpoint 140 may acknowledge in step 440 receipt of the health check packet 300. The destination endpoint 140 may parse in step 450 the health check packet 300. The destination endpoint 140 may inspect the health check packet 300 headers identifying information on the health check packet 350. During parsing, the destination endpoint 140 may identify a segment of the health check packet 300 as the health check signature 350 signaling that the packet is requesting health check information. The destination endpoint 140 may gather in step 460 statistical information related to the network traffic corresponding to the destination endpoint 140. The statistical information gathered may be based on instructions present in the health check packet 300. The destination endpoint 140 may send in step 470 a health check reply to the source endpoint 110 with the gathered statistical information.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product for providing a tunnel health check mechanism, the computer program product comprising a computer readable storage medium having computer readable program code embodied therewith, the computer readable program code being configured to:
   identify a first endpoint in a distributed overlay virtual Ethernet network;
   identify a second endpoint in the distributed overlay virtual Ethernet network;
   provide a tunneled health check packet configured to provide acknowledgment of receipt at the second endpoint and to indicate to the second endpoint to provide health check information to the first endpoint; and
   send the tunneled health check packet along a network path from the first endpoint to the second endpoint, wherein tunnel health check packets are encrypted and encapsulated, and are exchanged between user world agents using a reserved DomainID which is set to network attributes that are used within data packets, wherein at least one data packet, in a type-length-value format, follows the tunneled health check packet, and wherein the at least one data packet includes at least one of: a timestamp, statistics, or counters, that indicate tunnel health.

2. The computer program product of claim 1, wherein the computer readable program code is configured to send a tunneled data packet along the network path between the first endpoint and the second endpoint.

3. The computer program product of claim 1, wherein the computer readable program code is configured to apply a health check signature portion to the tunneled health check packet.

4. The computer program product of claim 3, wherein the health check signature portion is on an inner payload portion of the tunneled health check packet.

5. The computer program product of claim 4, wherein:
the computer readable program code is configured to send tunneled data packets along the network path; and
the tunneled health check packet includes outer header information corresponding to outer header information in the tunneled data packets sent along the network path.

6. The computer program product of claim 4, wherein the health check signature portion is on an inner Ethernet packet header.

7. The computer program product of claim 1, wherein the first endpoint and the second endpoint are virtual machines.

8. A distributed overlay virtual Ethernet network, comprising;
a first virtual machine;
a second virtual machine in communication with the first virtual machine; and
a controller configured to:
control tunneled data packets travelling between the first virtual machine and the second virtual machine along a path in the distributed overlay virtual Ethernet network, and
provide a tunneled health check packet configured to initiate a health check process corresponding to tunneled data packet traffic along the path between the first virtual machine and the second virtual machine in the distributed overlay virtual Ethernet network, wherein the second virtual machine gathers statistical information, related to network traffic corresponding to the second virtual machine, based on instructions present in the tunneled health check packet, wherein the tunneled health check packet includes private network data and corresponding protocol information, wherein the second virtual machine sends a health check reply, that includes the gathered statistical information, to the first virtual machine, and wherein the statistical information is based on instructions present in the tunneled health check packet.

9. The distributed overlay virtual Ethernet network of claim 8, wherein the controller is configured to include a health check signature portion to the tunneled health check packet.

10. The distributed overlay virtual Ethernet network of claim 9, wherein the health check signature portion is on an inner payload portion of the tunneled health check packet.

11. The distributed overlay virtual Ethernet network of claim 9, wherein the health check signature portion is on an inner Ethernet packet header.

12. The distributed overlay virtual Ethernet network of claim 8, wherein the tunneled health check packet includes outer header information corresponding to outer header information of the tunneled data packets.

13. The distributed overlay virtual Ethernet network of claim 9, wherein the second virtual machine is configured to strip away the health check signature portion and initiate the health check process based on remaining portions of the tunneled health check packet.

14. A network server, comprising:
one or more switching elements that perform ECMP/LAG hashing based on a VXLAN Id field; and
a computer readable storage medium having computer readable program code embodied therewith, the computer readable program code being configured to:
host one or more virtual machines in a distributed overlay virtual Ethernet network;
identify a network path hosting tunneled data packet traffic between a first endpoint in the distributed overlay virtual Ethernet network and a second endpoint in the distributed overlay virtual Ethernet network; and
provide a tunneled health check packet configured to initiate a health check process corresponding to the tunneled data packet traffic on the network path, wherein the tunneled health check packet is configured to not be treated according to source MAC address information or destination MAC address information, and wherein the tunneled health check packet appears to be of a public nature to a public network when actually the tunneled health check packet is a private data packet, wherein the tunneled data packet traffic and the tunneled health check packet follow a common network path.

15. The network server of claim 14, wherein the computer readable program code is configured to include a health check signature portion to the tunneled health check packet.

16. The network server of claim 15, wherein the health check signature portion is on an inner payload portion of the tunneled health check packet.

17. The network server of claim 15, wherein the health check signature portion is on an inner Ethernet packet header.

18. The network server of claim 14, wherein the tunneled health check packet includes outer header information corresponding to outer header information of the tunneled data packets.

19. The network server of claim 15, wherein the second endpoint is configured to strip away the health check signature portion and initiate the health check process based on remaining portions of the tunneled health check packet.

20. The network server of claim 14, wherein the first endpoint is at least one of the one or more virtual machines.

* * * * *